United States Patent [19]
Wingfield, deceased et al.

[11] 3,906,340

[45] Sept. 16, 1975

[54] TUNED CIRCUIT MONITOR FOR STRUCTURAL MATERIALS

[76] Inventors: Peter Maurice Wingfield, deceased, late of Winterbourne Kingston, England by Joanna Wingfield, legal representative, Cobblers Cottage, Winterbourne Kingston, Dorset, England

[22] Filed: Jan. 4, 1974

[21] Appl. No.: 430,761

Related U.S. Application Data

[63] Continuation of Ser. No. 248,693, April 28, 1972, abandoned.

[52] U.S. Cl. ............ 324/57 Q; 324/61 QS; 324/59; 331/65; 73/88.5 R
[51] Int. Cl.² ......................................... G01R 27/00
[58] Field of Search ............... 324/61 QS, 57 Q, 59; 331/65; 73/88.5 R

[56] References Cited
UNITED STATES PATENTS

| | | | |
|---|---|---|---|
| 2,021,760 | 11/1935 | Whitney | 324/61 QS |
| 2,419,266 | 4/1947 | Kliever et al. | 324/61 QS |
| 2,508,081 | 5/1950 | Taylor et al. | 324/61 QS |
| 2,576,489 | 11/1951 | Stovall, Jr. | 324/61 QS |
| 2,772,393 | 11/1956 | Davis | 324/61 QS |
| 2,885,633 | 5/1959 | Cook | 324/61 QS |
| 3,015,950 | 1/1962 | Doctor et al. | 324/61 QS |
| 3,350,944 | 11/1967 | De Michele | 331/65 X |

OTHER PUBLICATIONS

Dezettel; The Grid–Dip Meter, Electronics World, December 1960, pp. 50 and 51.

*Primary Examiner*—Stanley T. Krawczewicz
*Attorney, Agent, or Firm*—Cushman, Darby & Cushman

[57] ABSTRACT

The present invention is concerned with a system for sensing the integrity of structures using integral sensors consisting of small parallel tuned circuits whose electrical properties are monitored by means of oscillator means coupled to said tuned circuits.

3 Claims, 3 Drawing Figures

TUNED CIRCUIT MONITOR FOR STRUCTURAL MATERIALS

This is a continuation of application Ser. No. 248,693 filed Apr. 28, 1972, now abandoned.

The present invention is concerned with a system for sensing the integrity of structures such as GRP (glass reinforced plastic), concrete, plastics, etc., during their manufacture or construction or thereafter. The system uses integral sensors capable of detecting fatigue cracks, inter-lamellar delamination, degree of resin cure and other parameters, which consist of small parallel tuned circuits that in their simplest form might consist of a single loop of wire in parallel with a small capacitor. This type of sensor can be detected and some of its electrical properties, such as resonant frequency and electrical Q, can be measured by the use of a "grid dip" oscillator.

The use of a "grid dip" type of oscillator for measurement of passive resonant LC circuit parameters is well known. The method used is to inductively couple such an oscillator to the circuit under test and to tune the oscillator until a "dip" in the grid current of the oscillator is obtained. At the point of minimum deflection, the oscillator is at the resonant frequency of the test circuit and maximum energy is being absorbed by the latter. Any variation in the parameters of the test circuit will be reflected by changes in the tuning characteristics of the oscillator, i.e., sharpness of dip or actual frequency variation.

Accordingly, the present invention comprises a system for sensing changes in the nature of structural materials by monitoring the electrical characteristics of tuned electrical circuits incorporated in the structure.

The accompanying drawings illustrate examples of the present invention, in which.

Figure 1:
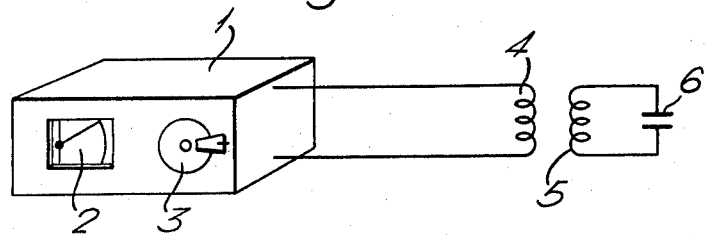
FIG. 1 shows schematically a grid dip oscillator inductively coupled to a tuned circuit.

In FIG. 1 the "grid dip" oscillator is shown schematically at 1 including a meter 2, to indicate the grid current in the oscillator, and a tuner 3 to vary the frequency of the oscillator. The oscillator is shown inductively coupled by a coil 4 to a sensor comprising a tuned circuit formed of an inductance 5 together with a capacitor 6.

Figure 2:
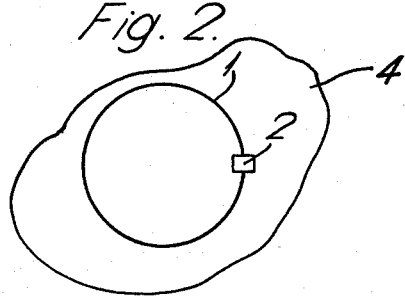
FIG. 2 shows one form of tuned circuit sensor.
Figure 3:
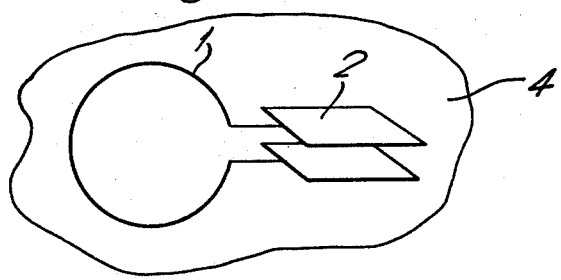
FIG. 3 shows an alternative form of tuned circuit sensor.

In FIG. 2 the tuned circuit sensor is formed of a single loop of conductor 1 together with a chip capacitor 2 and in FIG. 3 the tuned circuit sensor comprises a single or multiturn coil of conductor 1 together with a capacitor 2 embedded in material 4 formed of extended parallel plates.

The type of conductor which forms the coil may be selected to match the material in which it is embedded for fatigue characteristics or for sensing strain, as, for example, by a change in resistance with extension thereof. Variations in the effective dielectric of the structural material will effect the resonant frequency of the tuned circuit and the state of cure of plastics material or GRP might be monitored in this way by employing the material as the dielectric medium between the plates of the capacitor, which could be formed as shown in FIG. 3 embedded in material 4.

Since the resonant frequency and Q of the sensor depend on the dielectric medium in which it is embedded and in any variations in the resistance of the coil element (including an open circuit condition due to fracture of the coil by fatigue), the system can be made to give unambiguous indications of the state of the structure around the sensor.

Special forms of sensor can be devised in which the material for the structure can form the major dielectric material of the capacitor or in which the coil element can be made of fatigue sensitive materials such as a strain gauge appropriately chosen to respond in some pre-determined way to the fatigue properties, or other degradation of the structural material. By these means it is possible to monitor the state of cure of a resin, ingress of moisture, incipient or complete delamination, growth of fatigue cracks, etc., without the need to damage or weaken the structure.

I claim:

1. A system for sensing changes in the internal condition of solid materials using integral sensors embedded within the material wherein the sensors comprise resonant electric circuit means whose electrical characteristics are dependent on the condition of said material together with means for monitoring the electrical characteristics of said resonant electric circuit means, said circuit means comprising inductor means arranged electrically in parallel with capacitor means the dielectric of said capacitor means being formed by parts of said material, the electrical characteristics of said resonant electric circuit means being monitored by variable frequency oscillator means coupled inductively thereto.

2. A system according to claim 1 wherein said resonant electric circuit means includes conductor means embedded within the material the resistance of said conductor means varying according to the strain therein which corresponds to the strain in said material.

3. A system for sensing changes in the internal condition of solid materials using integral sensors embedded within the material wherein the sensors comprise resonant electric circuit means whose electrical characteristics are dependent on the condition of said material together with means for monitoring the electrical characteristics of said resonant electric circuit means, said resonant electric circuit means comprising inductor means arranged electrically in parallel with capacitor means said inductor means being formed of strain gauge material whose resistance varies with extension thereof, the electrical characteristics of said resonant electric circuit means being monitored by variable frequency oscillator means coupled inductively thereto.

* * * * *

UNITED STATES PATENT OFFICE
CERTIFICATE OF CORRECTION

Patent No. 3,906,340   Dated Sept 16, 1975

Inventor(s) Peter Maurice Wingfield

It is certified that error appears in the above-identified patent and that said Letters Patent are hereby corrected as shown below:

Insert following:

--[30]   Foreign Application Priority Data
      Apr. 30, 1971    United Kingdom.........12390/71--

Signed and Sealed this

*twenty-seventh* Day of *January 1976*

[SEAL]

Attest:

RUTH C. MASON
*Attesting Officer*

C. MARSHALL DANN
*Commissioner of Patents and Trademarks*